United States Patent
Yoshioka

(10) Patent No.: US 7,643,396 B2
(45) Date of Patent: Jan. 5, 2010

(54) OUTPUT VOLTAGE ADJUSTING METHOD FOR LASER POWER MONITORING

(75) Inventor: Jyouji Yoshioka, Daito (JP)

(73) Assignee: Funai Electric Co. Ltd., Osaka (JP)

( * ) Notice: Subject to any disclaimer, the term of this patent is extended or adjusted under 35 U.S.C. 154(b) by 779 days.

(21) Appl. No.: 11/443,510

(22) Filed: May 31, 2006

(65) Prior Publication Data

US 2006/0274632 A1 Dec. 7, 2006

(30) Foreign Application Priority Data

May 31, 2005 (JP) ............... 2005-158594

(51) Int. Cl.
*G11B 7/00* (2006.01)
(52) U.S. Cl. .................................... 369/116
(58) Field of Classification Search ............... None
See application file for complete search history.

(56) References Cited

U.S. PATENT DOCUMENTS

| | | | |
|---|---|---|---|
| 5,231,625 A * | 7/1993 | Hokozono et al. ........ | 369/116 |
| 5,367,515 A | 11/1994 | Yamazaki et al. ........ | 369/116 |
| 5,491,682 A * | 2/1996 | Dohmeier et al. ........ | 369/124.12 |
| 7,304,936 B2 * | 12/2007 | Yang et al. ............... | 369/116 |
| 2004/0202072 A1 * | 10/2004 | Rees et al. ............... | 369/47.5 |

FOREIGN PATENT DOCUMENTS

| | | |
|---|---|---|
| DE | 692 22 358 T2 | 1/1998 |
| EP | 0 724 256 A2 | 7/1996 |
| EP | 1 067 529 B1 | 4/2006 |
| JP | A-2004-146050 | 5/2004 |
| JP | A-2005-056965 | 3/2005 |

* cited by examiner

*Primary Examiner*—Joseph H Feild
*Assistant Examiner*—Christopher R Lamb
(74) *Attorney, Agent, or Firm*—Morgan Lewis & Bockius LLP

(57) ABSTRACT

To make the output voltage of a laser power monitor circuit (12) equal to a predetermined value at a predetermined laser power, adjustment is performed by changing an external variable resistance for output voltage adjustment. To achieve this, adjustment is performed by changing the variable resistance so that the difference between a high level output pulse of the laser power monitor circuit (12) obtained when an LD (11) is turned off and a low level output pulse obtained when the LD (11) is turned on is made equal to a target adjusted voltage. This prevents the offset of the laser power monitor circuit (12) from affecting a monitor output voltage, allowing an optical pickup to perform, for example, recording and reproducing with higher accuracy.

2 Claims, 5 Drawing Sheets

OUTPUT VOLTAGE ADJUSTING METHOD FOR LASER POWER MONITORING

This application is based on Japanese Patent Application No. 2005-158594 filed on May 31, 2005, the contents of which are hereby incorporated by reference.

BACKGROUND OF THE INVENTION

1. Field of the Invention

The present invention relates to an output voltage adjusting method for laser power monitoring whereby adjustment is performed in an optical pickup provided in an optical disk recording and reproducing apparatus by changing an external variable resistance for output voltage adjustment provided in a laser power monitor circuit so that the output voltage of the laser power monitor circuit is made equal to a predetermined value with a laser diode operating at a predetermined laser power.

2. Description of Related Art

Information is recorded on writable optical disks such as CD-Rs (Compact Disk-Recordable) or DVD-Rs (Digital Versatile Disk-Recordable), or rewritable optical disks such as CD-RWs (Compact Disk-Rewritable) or DVD-RWs (Digital Versatile Disk-Rewritable) in such a way that, for example, recorded pits are formed by irradiating an optical disk coated with an organic dye base recording material applied thereto with laser light. For the stable formation of recorded pits in such an optical disk under given conditions, it is necessary to control a driving current of a laser diode (hereinafter referred to as an LD) so as to obtain a constant laser power.

In optical disk recording and reproducing apparatuses, data is recorded as follows. For example, for CD-Rs and DVD-Rs, data is recorded thereon by irradiating a recording film formed on a disk with laser light of high intensity emitted from an LD and thus forming pits on the recording film by thermal reaction. For CD-RWs and DVD-RWs, data is recorded thereon by changing the crystalline state of the recording film. On the other hand, data recorded on the optical disk is reproduced by reading reflected light resulting from laser light of low intensity emitted from the LD and shone onto the recording film.

Incidentally, in an optical pickup provided in the optical disk recording and reproducing apparatus, adjustment is performed by monitoring the laser power of laser light emitted from the LD with a laser power monitor circuit and then feeding back the result thus obtained to a laser drive control circuit so that the laser power of the LD remains constant.

FIG. 5 is a block diagram showing the circuit configuration of a typical optical pickup. In FIG. 5, an optical pickup circuit 9 has an LD 1, an optical system 2, a laser power monitor circuit (which is an integrated circuit also called a front monitor PD circuit) 3 including a PD (that is, a photodiode) 4, a I/V (current/voltage) conversion circuit 5, and an amplification circuit 6, and a laser drive control circuit 7.

In order to perform an operation such as recording on or reproducing from an optical disk 8, the optical pickup circuit 9 first feeds, to the LD 1, a laser driving signal needed for such an operation from the laser drive control circuit 7. The LD 1 emits a laser optical signal having a laser power corresponding to the laser driving signal received from the laser drive control circuit 7. Much of the optical signal thus emitted is shone onto the optical disk 8 via the optical system 2; part thereof is incident on the PD 4 of the laser power monitor circuit 3. Then, a current flowing through the PD 4 is converted into a voltage by the I/V conversion circuit 5, and then is amplified to a voltage having a predetermined level by the amplification circuit 6. The resultant voltage is then fed back to the laser drive control circuit 7. This allows the laser drive control circuit 7 to adjust the voltage of a laser driving signal to be fed to the LD 1 based on the voltage fed back from the laser power monitor circuit 3.

The problem here is that the output voltage of the laser power monitor circuit 3 differs from one apparatus to another, and the offset present in the circuit such as the offset of the PD 4, if large enough, affects the laser power of the LD 1.

To address the problem described above, with a conventional output voltage adjusting method for laser power monitoring, adjustment is performed by measuring the laser power of laser light emitted from the LD 1 with an optical power meter and changing an external variable resistance for output voltage adjustment (for example, VR1 and VR2 shown in FIG. 3) while observing the output voltage of the laser power monitor circuit 3 with an oscilloscope so that the output voltage of the laser power monitor circuit 3 is made equal to a predetermined value with the LD 1 operating at a predetermined laser power.

For example, assume that adjustment is performed so that the output voltage of the laser power monitor circuit 3 is made equal to 15 mV with the LD 1 operating at a laser power (i.e., a light-emitting power) of 1 mW. Then, before adjustment, when the laser power is 0 mW (that is, the LD 1 is turned off), the output voltage (unadjusted FSPD output) of the laser power monitor circuit 3 is, for example, at a voltage level indicated by a line 61 shown in FIG. 6; after adjustment, when the laser power is 1 mW (that is, the LD 1 is turned on), the output voltage (adjusted FSPD output) of the laser power monitor circuit 3 is, for example, at a voltage level indicated by a line 62 shown in FIG. 6.

However, in actuality, since the laser power monitor circuit 3 has an offset voltage of ±15 mV as required according to the specifications of the laser power monitor circuit 3 (for example, the specifications of an integrated laser power monitor circuit 3), the adjusted output voltage of the laser power monitor circuit 3 is as follows. When the offset voltage is −15 mV, the adjusted output voltage is 0 mV; when the offset voltage is +15 mV, the adjusted output voltage is 30 mV. Additionally, the offset voltage varies as a result of adjustment within a range according to the specifications of the laser power monitor circuit 3. As a result, when the laser power is 1 mW, the adjusted output voltage of the laser power monitor circuit 3 will vary up to a maximum of 45 mV. The problem here is that an optical pickup built with the laser power monitor circuit 3 adjusted in a manner as described above suffers from poor accuracy, for example, in recording and reproducing, causing inconvenience in practical use.

With a conventional technique disclosed in JP-A-2005-56965, the magnitude of the offset to be produced in response to a given noise amplitude is determined previously so that the offset voltage value is set according to an actual noise amplitude. This technique, however, dose not suggest any linkage to an output voltage adjusting method for laser power monitoring whereby adjustment is performed by changing an external variable resistance for output voltage adjustment provided in a laser power monitor circuit so that the output voltage of the laser power monitor circuit is made equal to a predetermined value with an LD operating at a predetermined laser power.

With another conventional technique disclosed in JP-A-2004-146050, the gain of a monitor PD that monitors an optical power (that is, a laser power) of an LD is controlled. This technique too, however, does not suggest any linkage to an output voltage adjusting method for laser power monitoring whereby adjustment is performed by changing an external variable resistance for output voltage adjustment provided in a laser power monitor circuit so that the output voltage of the laser power monitor circuit is made equal to a predetermined value with an LD operating at a predetermined laser power.

SUMMARY OF THE INVENTION

In view of the above problems, it is an object of the present invention to provide an output voltage adjusting method for laser power monitoring that, when adjustment is performed by changing an external variable resistance for output voltage adjustment provided in a laser power monitor circuit so that the output voltage of the laser power monitor circuit is made equal to a predetermined value with an LD operating at a predetermined laser power, prevents the offset of the laser power monitor circuit from affecting a monitor output voltage.

To achieve this object, an output voltage adjusting method for laser power monitoring of the present invention is an output voltage adjusting method for laser power monitoring adopted in an optical disk recording and reproducing apparatus provided with an optical pickup including a laser diode for emitting laser light; a laser power monitor circuit including a photodiode for monitoring a laser power of the laser diode, the laser power monitor circuit for converting into a voltage a current flowing through the photodiode that receives part of the laser light emitted from the laser diode, and then outputting the voltage thus obtained; and a laser drive control circuit for keeping the laser power of the laser diode constant by making constant the output voltage of the laser power monitor circuit, the optical pick up for optically writing and reading information to and from an optical disk. The output voltage adjusting method for laser power monitoring is provided with: a first step of inputting a pulse signal having a predetermined frequency from the outside to a pulse input terminal used by the laser drive control circuit at the time of recording, and causing the laser diode to pulse-emit light by using a channel used by the laser drive control circuit at the time of recording light emission; and a second step of monitoring an output pulse of the laser power monitor circuit with a signal waveform measuring apparatus, and adjusting the amplitude of the output pulse so that the offset in the output pulse of the laser power monitor circuit is cancelled.

According to this output voltage adjusting method for laser power monitoring, when adjustment is performed by changing an external variable resistance for output voltage adjustment provided in the laser power monitor circuit so that the output voltage of the laser power monitor circuit is made equal to a predetermined value with the laser diode at a predetermined laser power, the amplitude of the output pulse of the laser power monitor circuit is adjusted so that the offset in the output pulse of the laser power monitor circuit is cancelled. This prevents the offset of the laser power monitor circuit from affecting a monitor output voltage, allowing the optical pickup to perform, for example, recording and reproducing with higher accuracy.

Preferably, in the above-described output voltage adjusting method for laser power monitoring, in the second step of adjusting the amplitude of the output pulse so that the offset in the output pulse of the laser power monitor circuit is cancelled, an external variable resistance for output voltage adjustment provided in the laser power monitor circuit is changed so that the difference between a high level output pulse obtained when the laser diode is turned off and a low level output pulse obtained when the laser diode is turned on is made equal to a target adjusted voltage. According to this method, it is possible to cancel the offset in the output pulse of the laser power monitor circuit. This allows the laser power monitor circuit to produce an output with high accuracy.

As described above, according to the present invention, to make the output voltage of the laser power monitor circuit equal to a predetermined value with the laser diode at a predetermined laser power, adjustment is performed by changing the external variable resistance for output voltage adjustment provided in the laser power monitor circuit. To achieve this, a pulse signal having a predetermined frequency is inputted from the outside to the pulse input terminal used by the laser drive control circuit at the time of recording, thereby causing the laser diode to pulse-emit light by using the channel used by the laser drive control circuit at the time of recording light emission. Then, the output pulse of the laser power monitor circuit is monitored with a signal waveform measuring apparatus, and the amplitude of the output pulse is adjusted so that the offset in the output pulse of the laser power monitor circuit is cancelled. This prevents the offset of the laser power monitor circuit from affecting a monitor output voltage, allowing the optical pickup to perform, for example, recording and reproducing with higher accuracy.

That is, according to the above-described output voltage adjusting method for laser power monitoring, it is possible to check how much laser power is emitted from the laser diode based on the output voltage of the laser power monitor circuit including the photodiode, and adjust the output voltage without exceeding the dynamic range of the apparatus. This permits the optical pickup to perform, for example, recording and reproducing with higher accuracy.

Moreover, according to the present invention, to make the output voltage of the laser power monitor circuit equal to a predetermined value with the laser diode at a predetermined laser power, adjustment is performed by changing the external variable resistance for output voltage adjustment provided in the laser power monitor circuit. Meanwhile, the offset in the output pulse of the laser power monitor circuit is cancelled. To achieve this, adjustment is performed by changing the external variable resistance for output voltage adjustment so that the difference between a high level output pulse obtained when the laser diode is turned off and a low level output pulse obtained when the laser diode is turned on is made equal to a target adjusted voltage. This prevents the offset of the laser power monitor circuit from affecting a monitor output voltage, allowing the optical pickup to perform, for example, recording and reproducing with higher accuracy.

That is, according to the above-described output voltage adjusting method for laser power monitoring, it is possible to check how much laser power is emitted from the laser diode based on the output voltage of the laser power monitor circuit including the photodiode, and adjust the output voltage without exceeding the dynamic range of the apparatus. This permits the optical pickup to perform, for example, recording and reproducing with higher accuracy.

DETAILED DESCRIPTION OF PREFERRED EMBODIMENTS

Hereinafter, an embodiment of the present invention will be described with reference to the accompanying drawings. For a front monitor PD (FSPD) adjusting method, that is, an output voltage adjusting method for laser power monitoring, the manufacturer's specifications state that the output voltage of a laser power monitor circuit can be adjusted by changing an external resistance (an external variable resistance for output voltage adjustment) provided in the laser power monitor circuit. Thus, the output voltage of the laser power monitor circuit is adjusted by changing the external resistance (the external variable resistance for output voltage adjustment) provided in the laser power monitor circuit. At this time, however, since the offset (for example, ±15 mV for a DVD and ±25 mV for a CD) is too large for a target adjusted voltage (for example, 15 mV±3 mV for a DVD and 90 mV±8 mV for a CD) and varies with variations in the external resistance, the offset affects the output voltage of the laser power monitor circuit. It is for this reason that, with the output voltage adjusting method for laser power monitoring of one embodiment of the present invention, the output voltage of the laser power monitor circuit is adjusted without giving any consideration to the influence of the offset of the laser power monitor circuit, making it possible to offer highly accurate output voltage adjustment.

Figure 1:
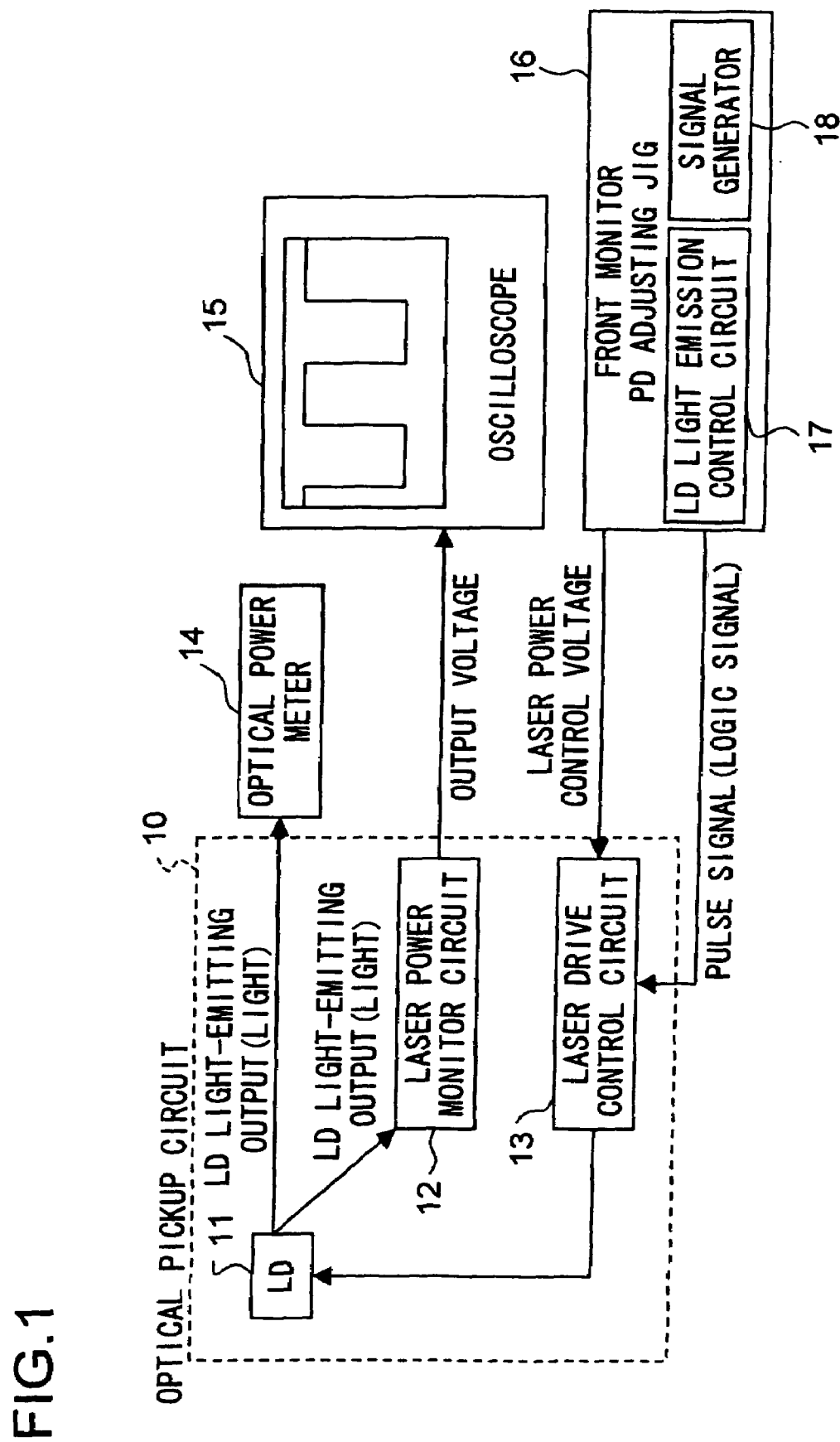
FIG. 1 is a block diagram showing the measuring configuration in which the output voltage adjusting method for laser power monitoring of one embodiment of the present invention is adopted.
Figure 5:
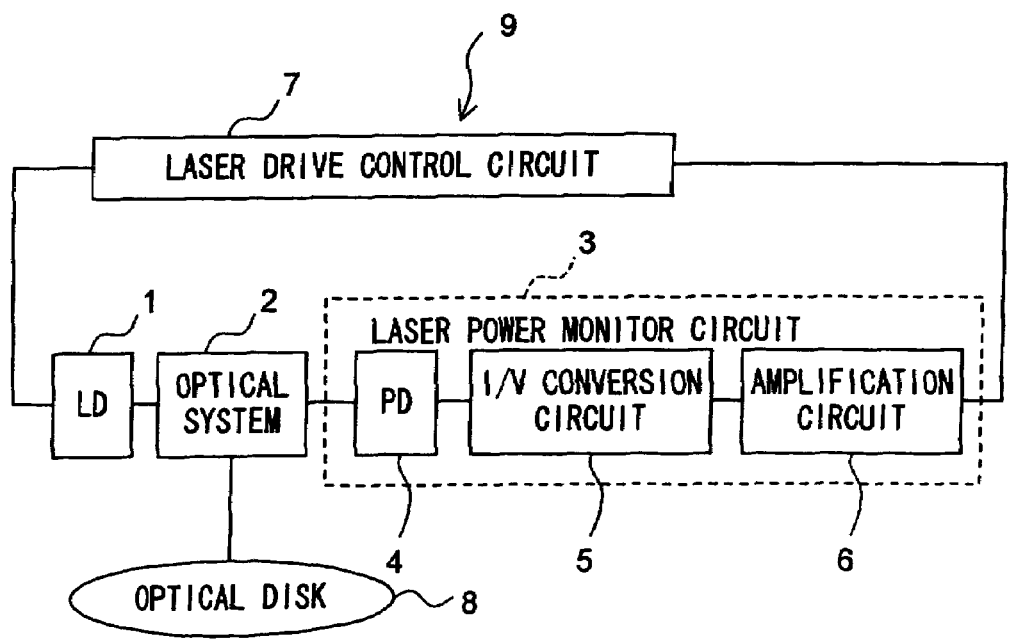
FIG. 5 is a block diagram showing the circuit configuration of a typical optical pickup.
Figure 6:
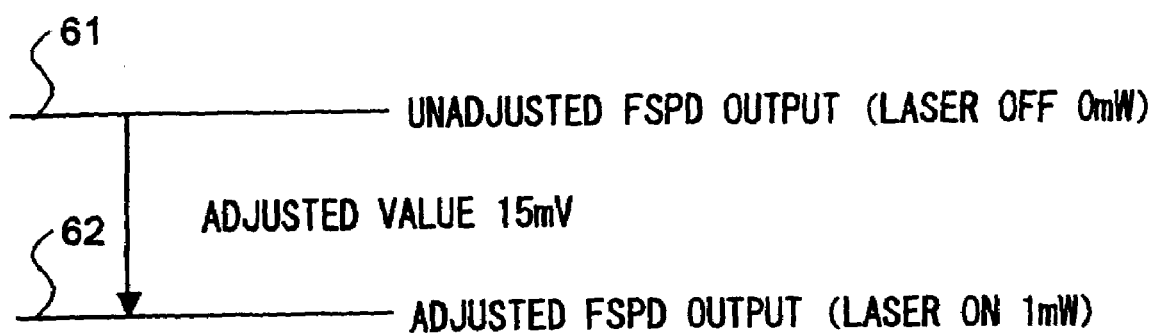
FIG. 6 is a signal waveform diagram for explaining a conventional output voltage adjusting method for laser power monitoring.

FIG. 1 is a block diagram showing the measuring configuration in which the output voltage adjusting method for laser power monitoring of one embodiment of the present invention is adopted. In FIG. 1, an optical pickup circuit 10 includes an LD (laser diode) 11 that emits laser light, a PD (not shown) that monitors a laser power (that is, an LD light-emitting output) of the LD 11, a laser power monitor circuit 12 that converts into a voltage a current flowing through the PD that has received part of the laser light emitted from the LD 11 via an optical system (not shown), then amplifies the voltage thus obtained to a predetermined level, and then outputs the resultant voltage, and a laser drive control circuit 13 that keeps the laser power of the LD 11 constant by making constant the output voltage of the laser power monitor circuit 12. The optical pickup circuit 10 is identical in circuit configuration to the optical pickup circuit 9 described earlier with reference to FIG. 5.

In FIG. 1, an oscilloscope 15 is a signal waveform measuring apparatus for measuring the output voltage of the laser power monitor circuit 12. A front monitor PD adjusting jig 16 includes an LD light emission control circuit 17 and a signal generator 18. The LD light emission control circuit 17 outputs a laser power control voltage to the laser drive control circuit 13, and the signal generator 18 outputs a pulse signal (that is, a logic signal) to the laser drive control circuit 13. Used as the signal generator 18 is, for example, a function generator.

Figure 2:
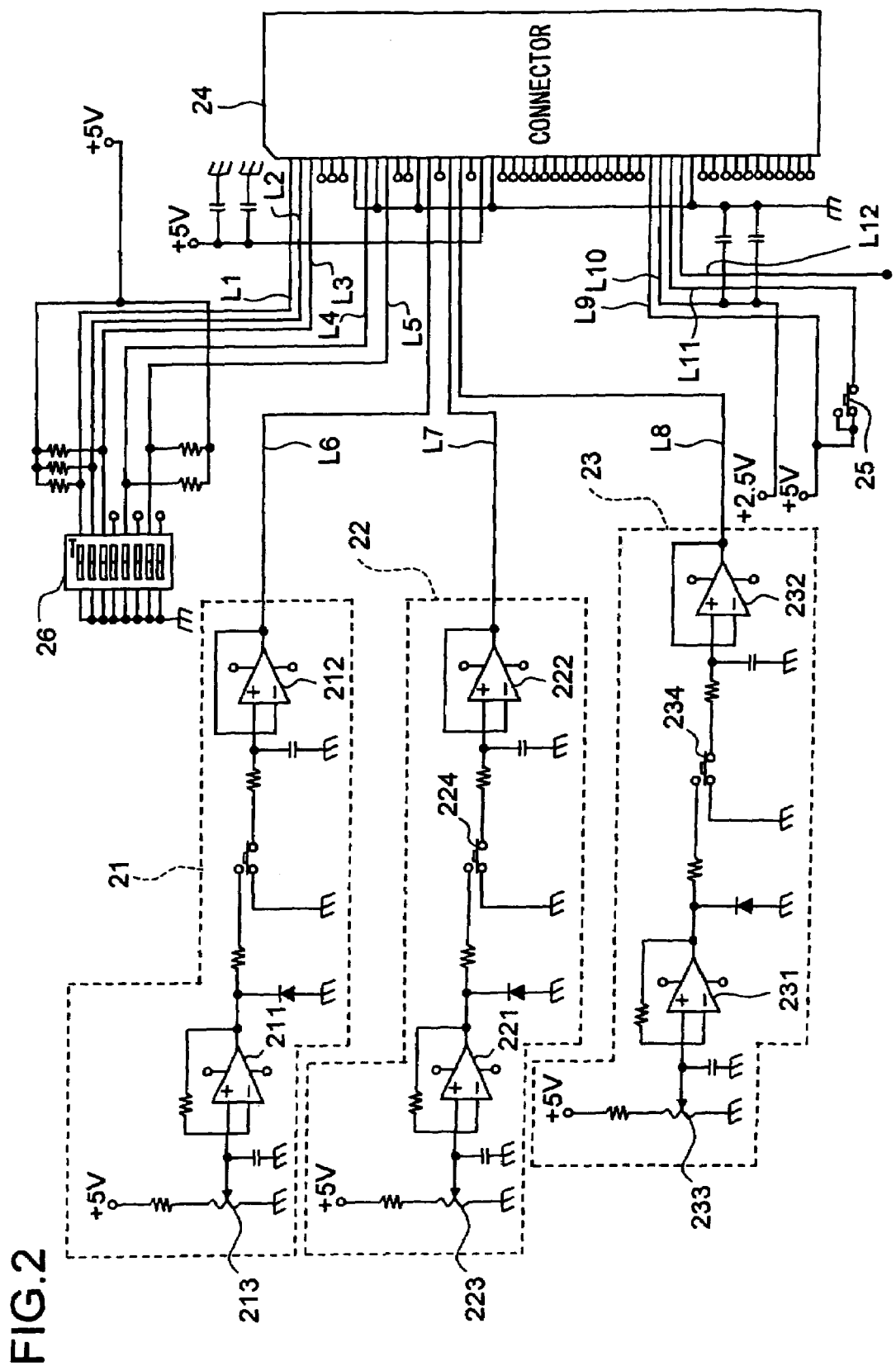
FIG. 2 is a circuit diagram showing an example of the adjusting jig circuit included in the front monitor PD adjusting jig shown in FIG. 1.

FIG. 2 is a circuit diagram showing an example of the adjusting jig circuit included in the front monitor PD adjusting jig 16 shown in FIG. 1. In FIG. 2, L1 represents a line for feeding a voltage used for making the LD emit light when a DVD is used, L2 represents a line for feeding a voltage used for making the LD emit light when a CD is used, L3 represents a line for transmitting a switching signal used for switching on/off of a superimposition circuit that superimposes a high-frequency signal on a laser driving signal, L4 and L5 represent lines for receiving a control signal from the outside, L6 represents a line (that is, the line for the channel for reproduction light emission) to which a voltage for making the LD emit light is fed at the time of reproduction, L7 represents a line (that is, the line for the channel for DVD recording light emission) to which a voltage for making the LD emit light is fed at the time of DVD recording, L8 represents a line (that is, the line of the channel for CD recording light emission) to which a voltage for making the LD emit light at the time of CD recording, L9 represents a line for feeding electric power to the laser power monitor circuit 12 (see FIG. 1), L10 represents a line for feeding a reference voltage to the laser power monitor circuit 12, L11 represents a line for switching between a voltage for a DVD and a voltage for a CD, and L12 represents an output line of the laser power monitor circuit 12.

A power supply circuit 21 of the channel for reproduction light emission includes, for example, operational amplifiers 211 and 212, and is configured so that a voltage set by a variable resistance 213 is outputted to the line L6. A power supply circuit 22 of the channel for DVD recording light emission includes, for example, operational amplifiers 221 and 222, and is configured so that a voltage set by a variable resistance 223 is outputted to the line L7. A power supply circuit 23 of the channel for CD recording light emission includes, for example, operational amplifiers 231 and 232, and is configured so that a voltage set by a variable resistance 233 is outputted to the line L8. The optical pickup circuit 10 (see FIG. 1) is connected to a connector 24 via a cable, which is not shown in the drawing.

When the output voltage of the laser power monitor circuit 12 is adjusted, a laser power control voltage from the front monitor PD adjusting jig 16 (see FIG. 1) is inputted to the laser drive control circuit 13 via the connector 24, and a pulse signal from the front monitor PD adjusting jig 16 is inputted to the laser drive control circuit 13 via the connector 24. A probe of the oscilloscope 15 (see FIG. 1) is connected to the line L12 shown in FIG. 2, and the output voltage of the laser power monitor circuit 12 is measured with the oscilloscope 15.

Figure 3:
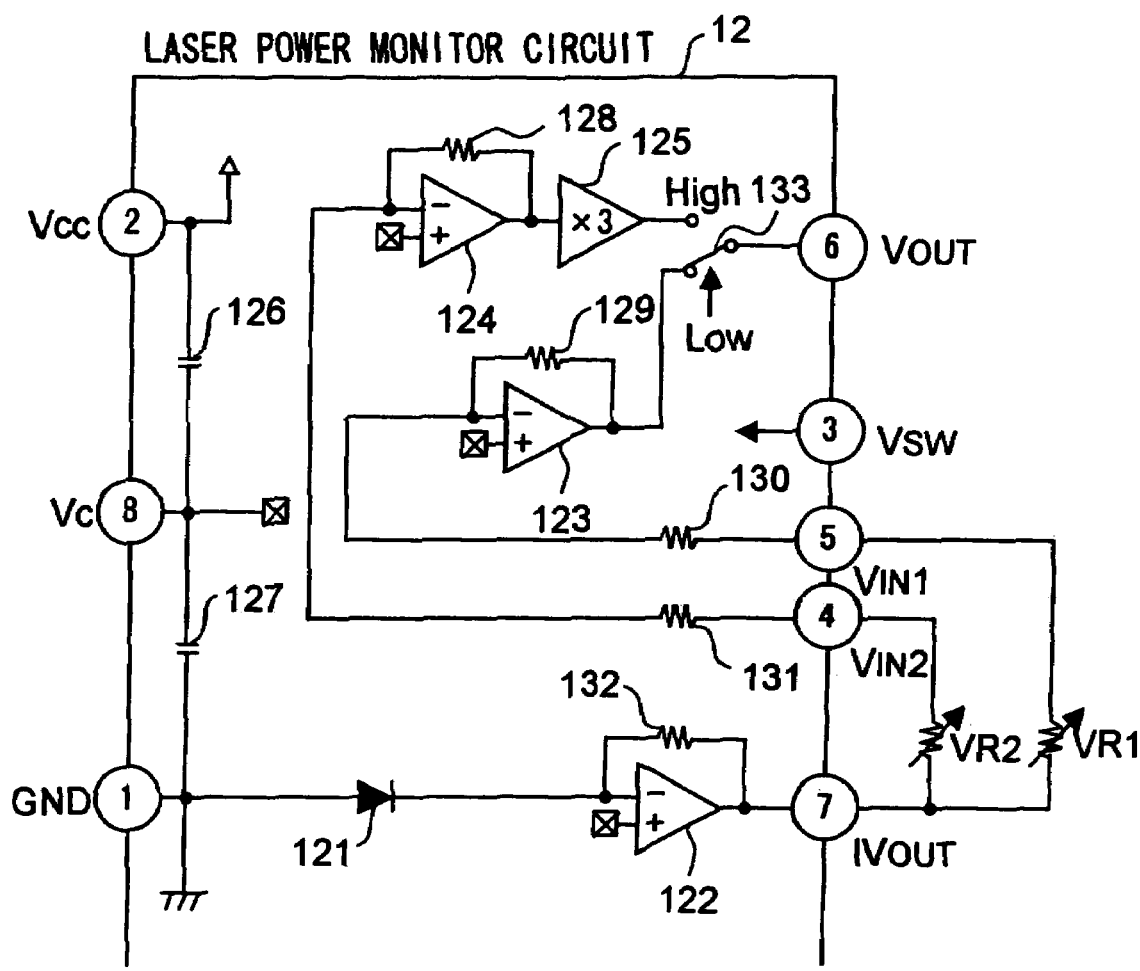
FIG. 3 is a circuit diagram showing the internal circuit configuration of an IC in which the laser power monitor circuit shown in FIG. 1 is integrated and the external terminals thereof.

FIG. 3 is a circuit diagram showing the internal circuit configuration of an IC in which the laser power monitor circuit 12 shown in FIG. 1 is integrated and the external terminals thereof. Inside the IC, the laser power monitor circuit 12 is provided with a PD (photodiode) 121, operational amplifiers 122, 123, and 124, a triple amplifier 125, capacitors 126 and 127, resistances 128, 129, 130, 131, and 132, and a switch 133. An external variable resistance VR1 for output voltage adjustment is connected as the external resistance between the 5-pin Vin1 terminal and the 7-pin IVout terminal, and an external variable resistance VR2 for output voltage adjustment is connected as the external resistance between the 4-pin Vin2 terminal and the 7-pin IVout terminal.

In this circuit configuration, when the PD 121 receives part of the laser light emitted from the LD 11 (see FIG. 1), a photodiode current flows therethrough. This photodiode current is converted into a voltage by the operational amplifier 122. The voltage thus obtained is fed to the operational amplifier 123 via the external variable resistance VR1 for output voltage adjustment and the resistance 130, and is then amplified thereby. At the same time, the voltage thus obtained is fed to the operational amplifier 124 via the external variable resistance VR2 for output voltage adjustment and the resistance 131, and is then amplified thereby. When a low level signal is inputted to the 3-pin Vsw terminal, the switch 133 is set to the Low position (that is, a monitor output voltage for driving a DVD). This permits the output voltage of the operational amplifier 123 to be outputted from the 6-pin Vout terminal via the switch 133. On the other hand, when a high level signal is inputted to the 3-pin Vsw terminal, the switch 133 is set to the High position (a monitor output voltage for driving a CD). As a result, the output voltage of the operational amplifier 124 is amplified three times by the triple amplifier 125, and is then outputted from the 6-pin Vout terminal via the switch 133.

Figure 4:
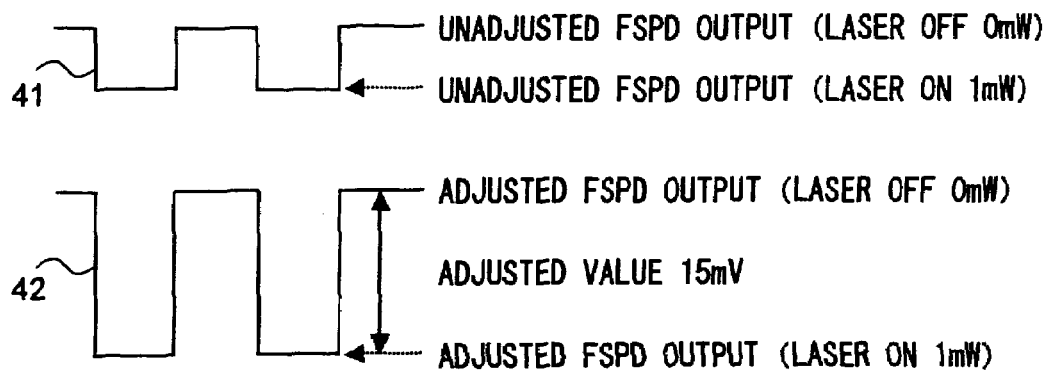
FIG. 4 is a signal waveform diagram for explaining the output voltage adjusting method for laser power monitoring of this embodiment.

FIG. 4 is a signal waveform diagram for explaining the output voltage adjusting method for laser power monitoring of this embodiment. Before adjustment, a pulse signal of 1 mW is applied to the LD 11 (see FIG. 1) as a driving signal. In FIG. 4, 41 represents a pulse voltage outputted from the laser power monitor circuit 12 operating as a result of the PD 121 (see FIG. 3) receiving part of the laser light emitted from the LD 11. A high level pulse voltage 41 (an unadjusted FSPD output) indicates a high level potential of the output voltage of the laser power monitor circuit 12 before adjustment when the LD 11 is turned off (laser power=0 mW); a low level pulse voltage 41 (an adjusted FSPD output) indicates a low level potential of the output voltage of the laser power monitor circuit 12 before adjustment when the LD 11 is turned on (laser power=1 mW).

After adjustment, a pulse signal of 1 mW is applied to the LD 11 (see FIG. 1) as a driving signal. In FIG. 4, 42 represents a pulse voltage outputted from the laser power monitor circuit 12 operating as a result of the PD 121 (see FIG. 3) receiving part of the laser light emitted from the LD 11. A high level pulse voltage 42 (an adjusted FSPD output) indicates a high level potential of the output voltage of the laser power monitor circuit 12 after adjustment when the LD 11 is turned off (laser power=0 mW); a low level pulse voltage 42 (an adjusted FSPD output) indicates a low level potential of the output voltage of the laser power monitor circuit 12 after adjustment when the LD 11 is turned on (laser power=1 mW).

As shown in FIG. 4, the output voltage of the laser power monitor circuit 12 before adjustment (the output voltage obtained when the LD 11 is turned off and a laser power is 0 mW) and the output voltage of the laser power monitor circuit 12 after adjustment (the output voltage obtained when the LD 11 is turned off and a laser power is 0 mW) have different voltage values. This results from the change in the offset due to adjustment. In this way, it becomes possible to make adjustment without giving any consideration to offset variations in the laser power monitor circuit 12 caused by adjustment.

Specifically, when adjustment is performed by changing the external variable resistance VR1 for output voltage adjustment, for example, provided in the laser power monitor circuit 12 so that the output voltage of the laser power monitor circuit 12 is made equal to a predetermined value (e.g., 15 mV) with the LD 11 operating at a predetermined laser power (e.g., a laser power of 1 mW), a pulse signal having a predetermined frequency (e.g., a pulse signal having a frequency of 30 KHz and a duty ratio of 50%) is inputted from the outside (e.g., the signal generator 18 shown in FIG. 1) to the pulse input terminal (e.g., the terminal that is provided in the connector 24 and is connected to the line L5 shown in FIG. 2) used by the laser drive control circuit 13 at the time of recording so that the LD 11 is caused to pulse-emit light by using the channel used by the laser drive control circuit 13 at the time of recording light emission (e.g., the power supply circuit 22 shown in FIG. 2) (corresponding to a first step recited in the attached claims).

Then, the output pulse of the laser power monitor circuit 12 is monitored with the oscilloscope 15. Meanwhile, the offset in the output pulse of the laser power monitor circuit 12 is cancelled. To achieve this, adjustment is performed by changing, for example, the external variable resistance VR1 so that the difference between the high level output pulse obtained when the LD 11 is turned off and the low level output pulse obtained when the LD 11 is turned on is made equal to a target adjusted voltage (corresponding to a second step recited in the attached claims).

Here, an example of how the output voltage adjusting method for laser power monitoring is actually performed for a DVD will be described. First, the range of the oscilloscope 15 is set at 50 mV/div, and an output voltage for a DVD is adjusted and checked in the following manner. Since an adjusted output voltage for a DVD is 150 mV, a cursor is set so that ΔY is 150 mV. At this time, the upper end of the cursor is placed in waveform.

Next, the wavelength of the optical power meter 14 is changed to 660 nm (a laser wavelength for a DVD) by pressing a λ button, and the output terminal leading from the function generator (the signal generator 18) is connected to the pin that is provided in the connector 24 and is connected to the line L5. Then, the switch that is provided in a DIP switch 26 and is connected to the line L1 is turned on, and the switch that is provided in the DIP switch 26 and is connected to the line L3 is turned on.

Then, the gain of the laser power monitor circuit 12 is set Low (that is, the switch 133 is set to the Low position), and a switch 224 of the power supply circuit 22 is turned on while observing the value displayed by the optical power meter 14. Then, the variable resistance 223 of the power supply circuit 22 is changed so that the value displayed by the optical power meter 14 is adjusted to be between 9.90 mW and 9.95 mW. After this adjustment, the switch that is provided in the DIP switch 26 and is connected to the line L5 is turned on, thereby making the LD 11 flash. When the LD 11 begins to flash, the waveform displayed on the oscilloscope 15 takes the form of a square wave, and then adjustment is performed by turning an adjustment knob (the external variable resistance VR1 for output voltage adjustment shown in FIG. 3) of an optical pickup so that the upper and lower ends of the waveform fit the width of an adjusted output voltage.

Next, an example of how the output voltage adjusting method for laser power monitoring is actually performed for a CD will be described. First, the range of the oscilloscope 15 is set at 10 mV/div, and an output voltage for a CD is adjusted and checked in the following manner. Since an adjusted output voltage for a CD is 33 mV, a cursor is set so that ΔY is 33 mV. At this time, the upper end of the cursor is placed in waveform.

Next, the wavelength of the optical power meter 14 is changed to 790 nm (a laser wavelength for a CD) by pressing a λ0 button, and the output terminal leading from the function generator (the signal generator 18) is connected to the pin that is provided in the connector 24 and is connected to the line L4. Then, the switch that is provided in a DIP switch 26 and is connected to the line L2 is turned on.

Then, the gain of the laser power monitor circuit 12 is set High (that is, the switch 133 is set to the High position), and a switch 234 of the power supply circuit 23 is turned on while observing the value displayed by the optical power meter 14. Then, the variable resistance 233 of the power supply circuit 23 is changed so that the value displayed by the optical power meter 14 is adjusted to be between 0.345 mW and 0.355 mW. After this adjustment, the switch that is provided in the DIP switch 26 and is connected to the line L4 is turned on, thereby making the LD 11 flash. When the LD 11 begins to flash, the waveform displayed on the oscilloscope 15 takes the form of a square wave, and then adjustment is performed by turning an adjustment knob (the external variable resistance VR2 for output voltage adjustment shown in FIG. 3) of an optical pickup so that the upper and lower ends of the waveform fit the width of an adjusted output voltage.

As described above, the end of this embodiment is to make the output voltage of the laser power monitor circuit equal to a predetermined value with a laser diode operating at a predetermined laser power. To achieve this, adjustment is performed by changing the external variable resistance for output voltage adjustment provided in the laser power monitor circuit. Meanwhile, the offset in the output pulse of the laser power monitor circuit is cancelled. To achieve this, adjustment is performed by changing the external variable resistance for output voltage adjustment so that the difference between the high level output pulse obtained when the laser diode is turned off and the low level output pulse obtained when the laser diode is turned on is made equal to a target adjusted voltage. This prevents the offset of the laser power monitor circuit from affecting a monitor output voltage, allowing the optical pickup to perform, for example, recording and reproducing with higher accuracy.

That is, with the above-described output voltage adjusting method for laser power monitoring, it is possible to check how much laser power is emitted from the laser diode based on the output voltage of the laser power monitor circuit including the photodiode, and adjust the output voltage without exceeding the dynamic range of the apparatus. This permits the optical pickup to perform, for example, recording and reproducing with higher accuracy.

What is claimed is:

1. An output voltage adjusting method for laser power monitoring adopted in an optical disk recording and reproducing apparatus, wherein the optical disk recording and reproducing apparatus comprises an optical pickup including a laser diode for emitting laser light, a laser power monitor circuit including a photodiode for monitoring a laser power of the laser diode, the laser power monitor circuit for converting into a voltage a current flowing through the photodiode that receives part of the laser light emitted from the laser diode, and then outputting the voltage thus obtained, and a laser drive control circuit for keeping the laser power of the laser diode constant by making constant an output voltage of the laser power monitor circuit, the optical pick up for optically writing and reading information to and from an optical disk, the output voltage adjusting method for laser power monitoring comprising:

a first step of inputting a pulse signal having a predetermined frequency from an outside to a pulse input terminal used by the laser drive control circuit at a time of recording, and causing the laser diode to pulse-emit light by using a channel used by the laser drive control circuit at a time of recording light emission; and a second step of monitoring an output pulse of the laser power monitor circuit with a signal waveform measuring apparatus, and adjusting an amplitude of the output pulse so that an offset in the output pulse of the laser power monitor circuit is cancelled.

2. The output voltage adjusting method for laser power monitoring of claim 1, wherein, in the second step of adjusting the amplitude of the output pulse so that the offset in the output pulse of the laser power monitor circuit is cancelled, an external variable resistance for output voltage adjustment provided in the laser power monitor circuit is changed so that a difference between a high level output pulse obtained when the laser diode is turned off and a low level output pulse obtained when the laser diode is turned on is made equal to a target adjusted voltage.

* * * * *